(12) United States Patent
Probst et al.

(10) Patent No.: US 6,685,835 B1
(45) Date of Patent: Feb. 3, 2004

(54) METHOD FOR FILTERING SURFACE WATER WITH THIN SUPERNATANT LAYER AND IMPLEMENTING PLANT

(75) Inventors: Laurent Probst, Essey les Nancy (FR); Thierry Coulom, Nancy (FR); Stéphane Boeglin, Neuves Maisons (FR)

(73) Assignee: Aquatrium, Nancy (FR)

( * ) Notice: Subject to any disclaimer, the term of this patent is extended or adjusted under 35 U.S.C. 154(b) by 0 days.

(21) Appl. No.: 09/889,643
(22) PCT Filed: Jan. 5, 2000
(86) PCT No.: PCT/FR00/00006
§ 371 (c)(1), (2), (4) Date: Jul. 18, 2001
(87) PCT Pub. No.: WO00/44676
PCT Pub. Date: Aug. 3, 2000

(30) Foreign Application Priority Data

Jan. 27, 1999 (FR) .............................................. 99 01064

(51) Int. Cl.[7] ................................................ C02F 3/06
(52) U.S. Cl. ...................... 210/650; 210/790; 210/805; 210/248; 210/434; 210/497.01; 210/500.21
(58) Field of Search ................................ 210/614, 615, 210/616, 617, 618, 620, 621, 622, 629, 767, 779, 789, 790, 805, 650, 248, 434, 497.01, 500.21

(56) References Cited

FOREIGN PATENT DOCUMENTS

| GB | 1333585 | 10/1973 |
|---|---|---|
| GB | 2236689 | 4/1991 |

*Primary Examiner*—Robert Popovics
(74) *Attorney, Agent, or Firm*—Gary M. Cohen

(57) ABSTRACT

In a method of filtration, a liquid to be filtered is brought into contact with the surface of a filter medium and is passed through the filter medium. A supernatant liquid layer is created on the surface of the filter medium, and the upper level of the liquid layer is suitably controlled. A hydraulic path is organized in the liquid layer, and a stream of the liquid to be treated is brought to the inlet of the hydraulic path. Liquid that has passed through the filter medium is recovered for n cycles by reinjecting the liquid into the supernatant layer at the outlet of the hydraulic path, producing in a section of the path a meeting of two opposed streams. The treated liquid is then drawn off after n cycles.

17 Claims, 2 Drawing Sheets

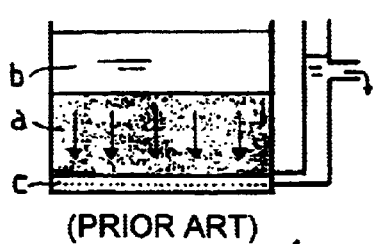
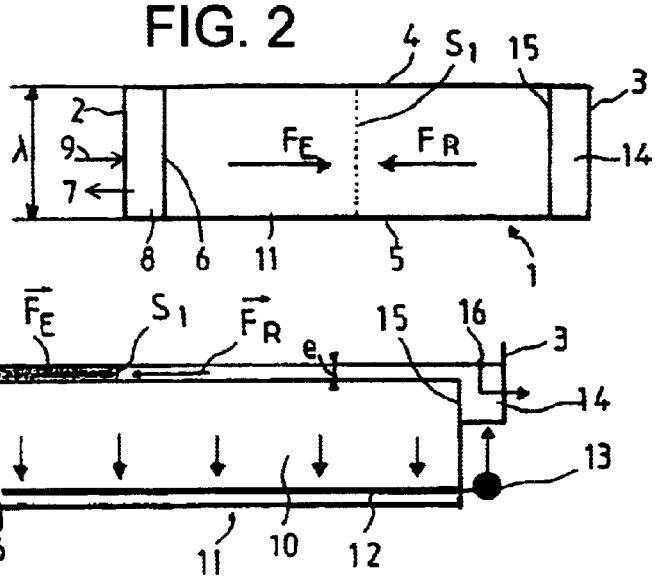
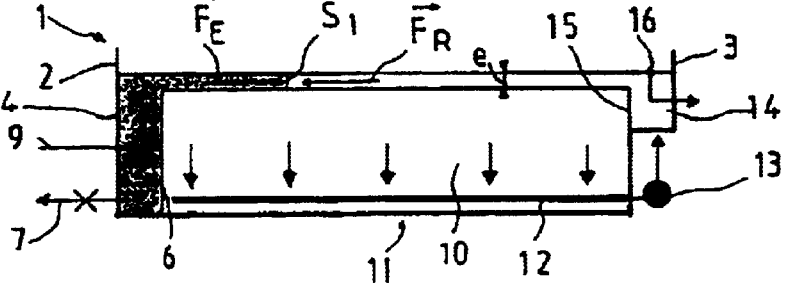
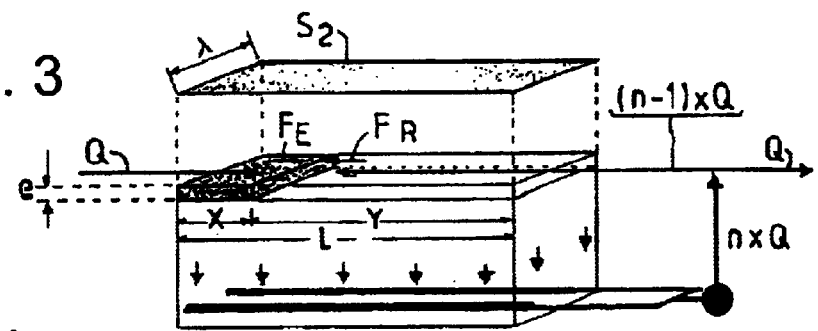
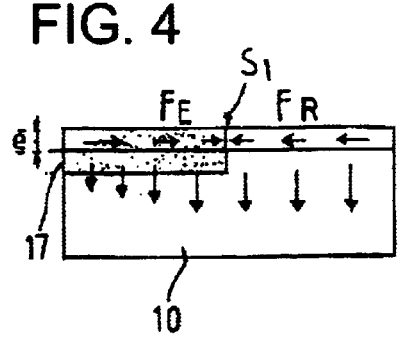
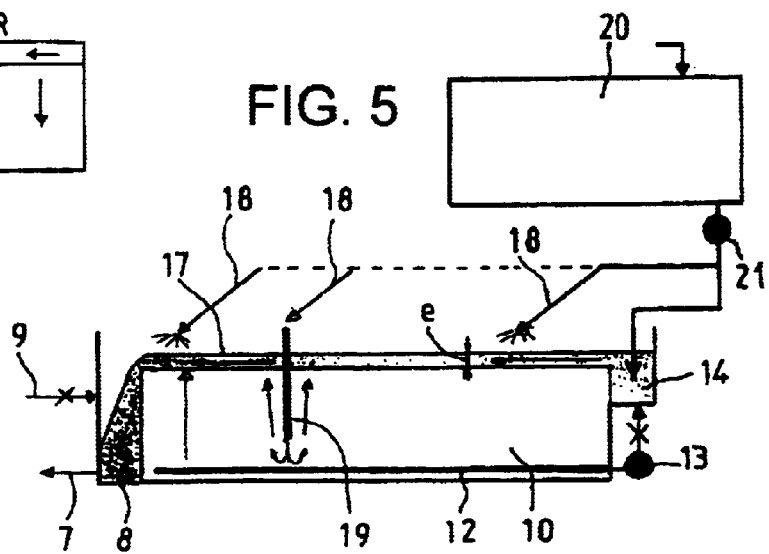

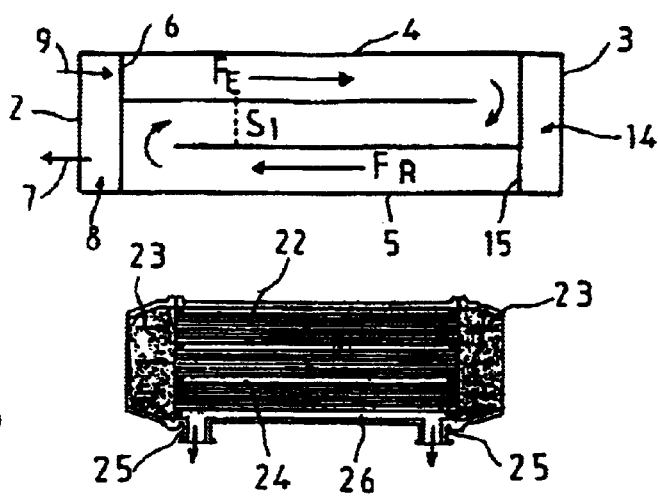
FIG. 6
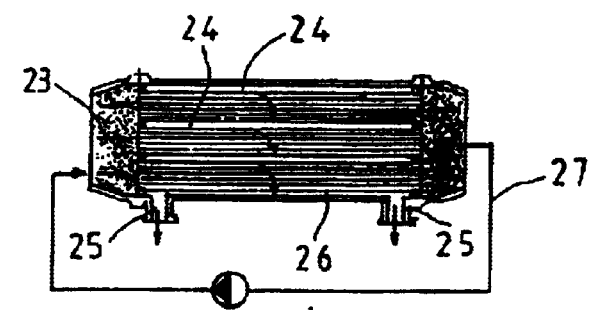
FIG. 7A (PRIOR ART)
FIG. 7B (PRIOR ART)
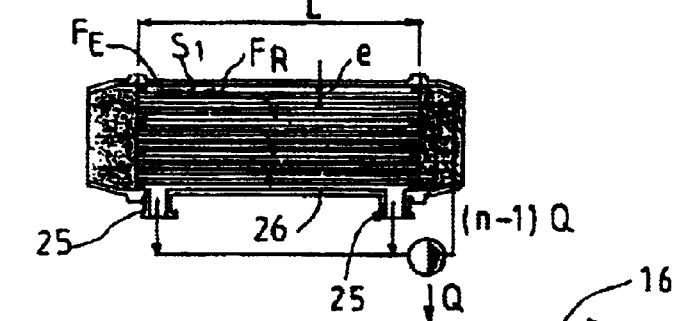
FIG. 8
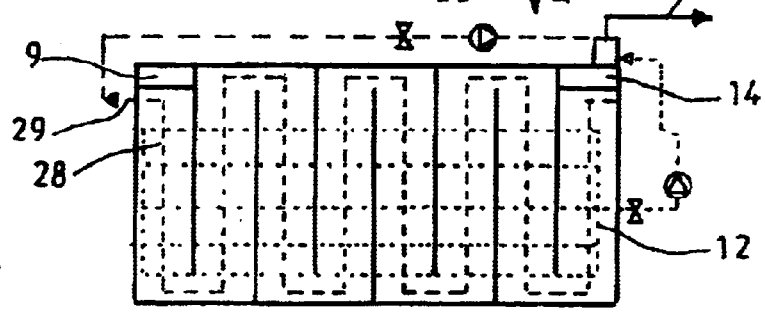
FIG. 9A
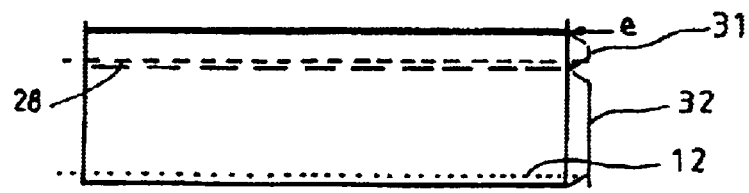
FIG. 9B

METHOD FOR FILTERING SURFACE WATER WITH THIN SUPERNATANT LAYER AND IMPLEMENTING PLANT

BACKGROUND OF THE INVENTION

The present invention relates to a novel method for the filtration of liquid media, including but not limited to surface water, and to plants for implementing the method.

One method which is conventionally used for treating surface water is slow biological filtration, which is a reproduction of the natural process of water self-purification. Referring to FIG. 1A, this technique is performed by causing a stream of water to be treated to percolate through a bed of filter material at velocities of less than 10 m/day. The operation of such a plant requires a filter material (a), the initial depth of which is about one meter, and a supernatant water height (b) of 1.5 to 2 meters. Consequently, the height of such a construction is between 2.5 and 3 meters. A drainage system (c) collects the filtered water at the bottom of the plant.

In such a plant, a stream of suspended matter from the raw water entering the filter material (a) spreads uniformly over the surface of the filter material (a), causing uniform clogging of the entire filtering surface and resulting in a rise in the supernatant water height (b) so as to maintain a constant output of treated water. After the water height (b) has reached a maximum level, it is necessary to intervene so as to carry out an unclogging operation.

Such unclogging takes place in three main phases, including drainage of the supernatant water, drawing-off of the first four centimeters of clogged filter material, and re-filling of the filter with water to be treated. These three operations are burdensome in their implementation, and take quite a long time to perform, potentially more than a week. It is therefore necessary to provide duplicate plants so as to maintain the production of suitable water.

Conventional slow biological filtration therefore requires the raw water to be of a quality of less than 10 NTU so as to limit the number of unclogging operations required over time. Moreover, the drawing-off of filter material during successive unclogging operations results in a gradual reduction in the height of the filter material. After a limiting height of 40 to 50 cm is reached, it is necessary to restock the filter material, presenting a limiting factor in the management of the plant.

It is an object of the present invention to overcome the constraints of such prior filtration systems.

SUMMARY OF THE INVENTION

To achieve this it has been found that, under certain operating conditions, proceeding contrary to the conventional teachings can lead to a new and unexpected phenomenon.

The conventional recycling of an outgoing stream is performed by reinjecting the outgoing stream into the incoming stream, upstream of a plant, which results in a dilution of the incoming stream. However, such conventional recycling does not lead to any improvement.

In accordance with the present invention, the outgoing stream is reinjected onto the surface of the filter medium, and the reinjected stream is caused to flow counter to the incoming stream while maintaining a small height of supernatant water so that there is no dilution of the streams. As a result, there is a localized deposition of matter on the surface of the filter material, initially near the inlet of the plant and then progressively expanding toward the outlet, until the entire surface of the filter material is covered.

The present invention is directed to a method for the filtration of liquid media, including but not limited to surface water, in which the liquid to be filtered, having a flow rate (Q), is brought into contact with the surface of a filter medium and is then passed through the filter medium. A supernatant liquid layer, having a small thickness (e), is created on the surface of the filter medium, the high level of which is suitably controlled. A hydraulic path, having a length (L), is organized in this thin supernatant layer, and a stream of liquid to be treated, having a flow rate (Q), is brought to the inlet of the hydraulic path. The liquid that has passed through the filter medium after n cycles, having a flow rate (nQ), is recovered by reinjecting it into the supernatant layer at the outlet of the hydraulic path. Thus, in one section of the path, a meeting of two opposed streams is produced. The treated liquid, having a flow rate (Q), is drawn off after n cycles. The ratio e/L is small, and is preferably less than 0.1.

As alternatives, the high level of the supernatant layer having the thickness (e) is determined by the position of the outlet of the treated liquid having the flow rate (Q), or the thickness (e) is limited by choosing a filter medium in tube form, having a small inside diameter.

A plant for implementing the method of the present invention is comprised of a filter medium, onto the surface of which is brought a liquid to be treated, having flow rate (Q), so that the liquid to be treated is passed through the filter medium. The plant comprises means for determining a supernatant liquid layer of a small thickness (e) on the surface of the filter medium, means for determining a hydraulic path of a length (L) in the resulting thin supernatant layer, and an inlet for the liquid to be treated, located at one end of the hydraulic path. A recycling loop takes the liquid from the exit from the filter medium to an injection point located at the other end of the hydraulic path, where the outlet for the filtered liquid discharged from the plant is also located.

The method of the present invention overcomes the drawbacks of prior methods, and the plants which implement the method of the present invention are of a simple design. The main advantages include the following. The height of such constructions is considerably reduced (height reduced by a factor of 6). It is possible to treat high levels of suspended matter, for example, surface water and karstic water with a turbidity greater than 300 NTU. Treatment quality can be maintained despite a large variation in the quality of the raw water. The addition of a chemical reactant is not required. The clogged material on the surface is organized and limited without penetration (i.e., piling-up of the suspended matter in the first part of the filter). Clogging only occurs on the surface. There is direct access to the clogged layer from above the filter. Unclogging is easily performed using a tool of the scraper or water-jet type. There is no loss and no draw-off of filter material, hence perpetuity of the plant. Intense biological activity is maintained (since the filter material is highly seeded over the first few centimeters and is not drawn off after each washing of the clogged layer). There is very low energy consumption (less than 0.4 kW per $m^3$ of water produced).

In one embodiment of the plant, the filter medium is sand and the thickness (e) (the high level of the supernatant layer) is determined by the outlet level of the filtered liquid discharged from the plant. In another embodiment, the filter medium is an array of filter tubes having membrane walls through which the liquid passes, and the thickness (e) is limited by the diameter of the tubes.

For further description of the method and the apparatus of the present invention, reference is made to the description which follows, together with the following drawings.

BRIEF DESCRIPTION OF THE DRAWINGS

FIG. 1A is a schematic illustration, in vertical cross section, of a plant of the prior art.

FIG. 1B is a schematic illustration, in vertical cross section, of an example of a plant produced in accordance with the present invention and its operating principle.

FIG. 2 is a schematic illustration, shown from above, of the plant shown in FIG. 1B.

FIG. 3 is a perspective view of the plant shown in FIG. 1B, showing its operation.

FIG. 4 is a cross-sectional view showing a clogged region in the plant shown in FIG. 1B.

FIG. 5 is a schematic illustration of the method of washing the plant of FIG. 1B.

FIG. 6 is a schematic illustration, shown from above, of a hydraulic path corridor which can be provided in the supernatant layer of the plant.

FIGS. 7A and 7B are cross-sectional views showing a membrane filtration module of the prior art, operating according to two known methods.

FIG. 8 is a cross-sectional view showing a membrane filtration module operating in accordance with the method of the present invention.

FIG. 9A is a cross-sectional view, shown from above, of an embodiment of a double-drainage filtration tank.

FIG. 9B is a cross-sectional view, shown from the side, of the double-drainage filtration tank shown in FIG. 9A.

DETAILED DESCRIPTION OF THE INVENTION

FIGS. 1B to 5 show an example of a first embodiment of a plant which operates in accordance with the method of the present invention. The illustrated filtration plant comprises a filtration tank (1), the overall shape of which is parallelepipedal, with two side walls (4, 5) which are preferably larger than the two end walls (2, 3).

A vertical separating wall (6) is positioned parallel to the inlet end wall (2), and preferably has the same width ($\lambda$), so as to create an inlet compartment (8) into which the incoming raw water (9) will run. The separating wall (6) extends to the bottom of the tank (1) in order to allow the washing which will be explained below. The height of the separating wall (6) is less than that of the end wall (2) so that after the compartment (8) has been filled, the raw water can pass continuously and uniformly over the separating wall (6) and along the entire width ($\lambda$).

As a result, the raw water enters horizontally onto the free surface of a filter medium (10), in this case sand, which is contained in the main tank (11) of the plant. The raw water passes through the layer of filter material (10) and is then drawn off by a pump (13), for discharge through one or more drains (12) provided at the bottom of the tank, and is reinjected into an output compartment (14) for the purpose of at least one recycling operation under conditions which will be described below.

The output compartment (14) is separated from the main tank (11) by a separating wall (15) which is parallel to the outlet wall (3) of the main tank (11) and which has the same width ($\lambda$) as the tank (11). The water from the drains (12) is injected into the output compartment (14), preferably at the bottom. The output compartment does not necessarily have the same depth as the main tank (11), but the horizontal upper edge of the separating wall (15) is necessarily at the same level as that of the separating wall (6) so that, after the output compartment (14) has been filled, the recycled water is directed toward the main tank and over the top of the wall (15), and is distributed uniformly over the free surface of the filter medium (10).

Two resulting streams, of raw water ($F_E$) and of recycled water ($F_R$), then flow in opposite directions over the surface ($S_2$) of the filter medium and meet at an imaginary vertical contact surface ($S_1$). These streams are shown symbolically by the arrows ($\overrightarrow{F}_E$) and ($\overrightarrow{F}_R$), in opposite directions, on each side of the contact surface ($S_1$).

The level of liquid above the free surface of the filter medium is determined by the position of the treated water outlet (16) which is located in the output compartment. The thickness of this supernatant liquid layer is denoted by the symbol (e).

From the first water recycling operation, the stream ($\overrightarrow{F}_R$) of recycled water, which has already been filtered and cleaned, flows counter to the stream ($\overrightarrow{F}_E$) of dirty water to be treated. It is very quickly observed that the raw water remains confined at the inlet end of the main tank. With further recycling, it has surprisingly been found that matter is not retained in the filter medium, but instead creates a layer of sedimented matter (17) of a few millimeters on the surface, which extends progressively toward the outlet and which progressively clogs the free surface of the filter medium. Overall, it may be stated that the contact surface ($S_1$) between the two streams shifts progressively from the inlet toward the outlet of the plant.

The clogging of the filter medium causes, for a constant pumping force, an increase in head losses and, eventually, a reduction in the recycling rate. As long as the recycling rate is greater than the feed rate, the quality of the water is more or less constant since the reduction in filtration cycles is compensated by the effectiveness of the filtration for each cycle, which gradually increases with clogging.

The conditions under which the plant is operated, using the parameters indicated in FIG. 3, are the following:

e=thickness of the supernatant layer;

$S_2$=horizontal projection of the upper surface of the filter medium; and $S_1$=contact surface between the streams $F_E$ and $F_R$. It is necessary that:

$S_2 >> S_1$ i.e., $L \times \lambda >> e \times \lambda$ i.e., $L >> e$ or $e/L <> 1$ and it is therefore necessary to have a ratio $e/L <> 1$, and preferably less than 0.05.

At each start-up of the plant, after an unclogging operation, the equations for operation of the plant may be written as follows. For a given flow rate (Q) of raw water at the inlet (9) and of treated water at the outlet (16), and for a flow rate (n−1) × Q of recycled water reinjected into the main tank (11), where:

L=length of the path;

X=length of the raw water in the clogging phase;

Y=L−X=length of the raw water not subjected to clogging; and

N>1, where n=recycling rate; the position of the front ($s_1$) is given by the equations:

$$X = 1/n \times L;\text{ and}$$

$$Y = L \times (1 - 1/n).$$

Thus, when the number (n) of cycles increases, X decreases and Y increases.

The velocities at the inlet and at the outlet of the plant, which are regulated for a given size of the plant, produce as an input and an output, streams of turbulent flow which remain confined in the input compartment (8) and output compartment (14). The velocities of these streams decrease as they advance in the supernatant layer (e). A laminar flow is obtained on each side of the contact surface ($S_1$), thus limiting to the maximum extent the chemical and physical exchanges of any kind between the two fluids. For e/L<0.01, the best operating results are obtained and the streams ($F_E$) and ($F_R$) do not mix. For 0.01<e/L<0.05, very good results are also obtained. For 0.05<e/L<0.1, the results are acceptable. For increasing values of the ratio e/L greater than 0.1, greater and greater mixing between the streams ($F_E$) and ($F_R$) is progressively observed, this being prejudicial to proper operation of the plant unless prevented.

Referring to FIG. 5, methods for washing the plant will now be explained. A first washing of the surface is carried out either regularly or when it is noticed that the sediment layer (17) covers practically the entire free surface of the filter medium. To do this, the plant is first stopped by closing off the inlet (9) for the water to be treated and the outlet (13) for the recycled water. Using a jet (18) and/or a scraper, the surface sediments are pushed toward the input compartment and are extracted via the washing outlet (7) located at the bottom of the input compartment (8).

This operation is very simple and very quick. Since the filtered matter remains above the filter medium, without mixing with it, the washing of the present invention will entrain only the deposited matter, without reducing the height of the filter medium (i.e., no loss of sand), unlike prior plants, in which the obtained matter and the sand are mixed together (i.e., loss of sand by withdrawal of the mixture for unclogging purposes).

Treated water can optionally be used as washing water, for example, by storing treated water in a tank (20) and by drawing stored water from the tank (20), using the pump (21) shown in FIG. 5.

To prevent clogging of the filter medium throughout its thickness, a deep washing procedure can be performed by injecting a pressurized liquid into the filter medium. Referring to FIG. 5, this can be done by placing a tube (19) at a depth within the filter medium, for introducing the pressurized liquid into and moving the liquid within the mass of sand. This can be useful, for example, following an accidental malfunction.

Alternative embodiments of the foregoing can also be provided. For example, two or three filtration tanks, each similar to the tank (1), can be used in series if the amount of matter to be separated is considerable.

Provision can also be made to direct the stream flows ($F_E$) and ($F_R$) onto the free surface of the filter medium, for example, using the plural corridors which are shown in FIG. 6. The previously mentioned length (L) is in this case the length of the total path of the streams between the inlet and outlet of the corridor. This makes it possible to increase the length (L), for a filter medium having the same surface area, and therefore further reduce the e/L ratio so as to optimize the plant.

Another alternative embodiment of a sand filter produced in accordance with the present invention is shown in FIGS. 9A and 9B. In this embodiment, the plant is equipped with two drain-offs. An upper drain-off (28) is provided having a geometry which follows that of the path of the streams in the baffled corridors placed in the supernatant layer (e). The upper drain-off (28) is placed in the upper part of the filter medium, and is characterized by a high flow rate (n=10), which allows the length (X) to be minimized. Preferably, the outlet (29) of this drain is located on the same side as the raw water inlet (9) in order to be recycled into the outlet (14) of the plant. A lower drain-off (12) is placed at the bottom of the filter medium (see FIGS. 1B to 6), and is characterized by a much lower flow rate (n=1.5), which makes it possible to maintain a slow filtration velocity.

In all of the foregoing, it will be understood that the sand which forms the filter medium may be composed of a layer of sand having a uniform particle size or of several superposed layers of sand having different particle sizes, for example, the two layers (31, 32) which are shown in FIG. 9B.

It is also possible to use other types of filtration means, such as the known membrane filter modules which are used in microfiltration, ultrafiltration and nanofiltration. By way of example, such a module has been shown operating in a transverse mode, in FIG. 7A, and in a tangential mode, in FIG. 7B (the two known operating modes).

Such a module comprises several bundles of filter tubes (22), the walls of which constitute the filter medium through which the liquid to be treated passes. In the examples shown in FIGS. 7A and 7B, the liquid to be treated (23) is first injected into the tubes (22), then collected after being filtered in the interstitial gap (24), and then extracted via two outlets (25) made in the metal casing (26). In the case of FIG. 7B, an untreated fraction (27) of the liquid is reinjected into the tubes for a conventional recycling operation, as previously described.

FIG. 8 shows the same module as is shown in FIGS. 7A and 7B, operating in accordance with the present invention. The liquid to be filtered, having a flow rate (Q), is injected into the tubes at one end. The liquid then passes through the walls of the tubes, and is then extracted at the outlets (25) in the casing of the module and partly reinjected into the tubes, but at the end opposite the inlet end (for the liquids to be treated). Thus, two opposed streams ($\vec{F}_E$) and ($\vec{F}_R$) are obtained in each tube, which meet at a section ($S_1$) of the tube. Sediment is deposited on the inner wall of the tube, extending progressively until filling the entire length (L) of the tube. Cleaning is therefore easily accomplished, by the injection of pressurized liquid after shutting down the plant. The e/L ratio is in this case determined by the dimensions of the components, with (e) being the diameter of a tube and (L) being its length.

What is claimed is:

1. A method for filtration of a liquid media, including the filtration of surface water, comprising the steps of:

bringing a first stream of the liquid to be filtered into contact with a surface of a filter medium and passing the liquid to be filtered through the filter medium, wherein the first stream has a flow rate (Q);

creating a supernatant liquid layer on the surface of the filter medium, and controlling the level of the supernatant liquid layer so that the supernatant liquid layer has a defined thickness (e);

organizing a hydraulic path in the supernatant liquid layer, wherein the hydraulic path has a length (L), defined between an inlet and an outlet of the hydraulic path;

introducing the first stream into the inlet of the hydraulic path;

passing the first stream through the filter medium for a plurality of n cycles;

recovering the liquid that has passed through the filter medium for the plurality of n cycles and reinjecting a second stream of the recovered liquid into the supernatant liquid layer at the outlet of the hydraulic path, wherein the second stream has a flow rate (nQ), so that the first stream and the second stream meet and oppose each other in a section of the hydraulic path; and drawing treated liquid off from the hydraulic path after the plurality of n cycles, wherein the treated liquid is drawn off at a flow rate (Q).

2. The filtration method of claim 1 wherein a ratio (e/L) of the thickness (e) of the supernatant liquid layer to the length (L) of the hydraulic path is less than 0.1.

3. The filtration method of claim 2 wherein the ratio (e/L) is less than 0.05.

4. The filtration method of claim 3 wherein the ratio (e/L) is less than 0.01.

5. The filtration method of claim 1 which further includes the step of determining the level of the supernatant liquid layer by positioning of the outlet of the hydraulic path.

6. The filtration method of claim 1 wherein the filter medium includes a tube through which the liquid media can pass, wherein the tube has a defined inside diameter, and wherein the method further includes the step of limiting the level of the supernatant liquid layer by selecting the inside diameter of the tube.

7. A filtration plant, for the filtration of liquid media including surface water, comprising:

a filter medium having a surface for receiving a first stream of a liquid to be treated, wherein the first stream has a flow rate (Q), so that the liquid passes through the filter medium and so that a supernatant liquid layer having a thickness (e) is formed on the surface of the filter medium;

a hydraulic path formed in the supernatant liquid layer, wherein the hydraulic path has an inlet for receiving the first stream at a first end of the hydraulic path and an outlet for receiving a second stream at a second end of the hydraulic path, and wherein the hydraulic path has a length (L); and a recycling loop coupling the filter medium with the outlet of the hydraulic path so that liquid from the filter medium is introduced into an injection point located at the second end of the hydraulic path which includes the outlet, wherein the first stream and the second stream meet and oppose each other in a section of the hydraulic path;

wherein a ratio (e/L) of the thickness (e) of the supernatant liquid layer to the length (L) of the hydraulic path is less than 0.1; and wherein filtered liquid produced by the plant is drawn from the output.

8. The filtration plant of claim 7 wherein the ratio (e/L) is less than 0.05.

9. The filtration plant of claim 8 wherein the ratio (e/L) is less than 0.01.

10. The filtration plant of claim 7 wherein the outlet is located at a defined level, and wherein the level of the supernatant liquid layer is determined by the level of the outlet.

11. The filtration plant of claim 7 wherein the filter medium is located in a plurality of filter tubes having membrane walls and a defined diameter, wherein liquid passes through the filter tubes, and wherein the level of the supernatant liquid layer is determined by the diameter of the tubes.

12. The filtration plant of claim 7 wherein the filter medium is sand.

13. The filtration plant of claim 12 wherein the sand is contained in a main tank having a rectangular shape, wherein the main tank has an input compartment at one end and having an inlet for receiving a raw liquid, and an output compartment at another end and having an outlet for treated liquid, and at least one drain for extracting liquid that has passed through the sand, wherein the liquid extracted from the at least one drain is reinjected into the output compartment, thereby performing at least one recycling operation.

14. The filtration plant of claim 13 which further includes a washing outlet in bottom portions of the input compartment.

15. The filtration plant of claim 14 which further includes a secondary tank for storing washing water.

16. The filtration plant of claim 13 which further includes an upper drain-off having a first flow rate.

17. The filtration plant of claim 16 which further includes a lower drain-off having a second flow rate which is lower than the first flow rate.

* * * * *